(12) United States Patent
Zhang et al.

(10) Patent No.: US 11,416,303 B2
(45) Date of Patent: Aug. 16, 2022

(54) EDGE COMPUTING ACCESS METHOD AND AN EDGE COMPUTING NODE DEVICE

(71) Applicant: Shenzhen Jingjiang Yunchuang Technology Co., Ltd., Shenzhen (CN)

(72) Inventors: Xue-Qin Zhang, Shenzhen (CN); Juka Oh, Shenzhen (CN)

(73) Assignee: Shenzhen Jingjiang Yunchuang Technology Co., Ltd., Shenzhen (CN)

(*) Notice: Subject to any disclaimer, the term of this patent is extended or adjusted under 35 U.S.C. 154(b) by 130 days.

(21) Appl. No.: 17/026,662

(22) Filed: Sep. 21, 2020

(65) Prior Publication Data

US 2021/0342189 A1 Nov. 4, 2021

(30) Foreign Application Priority Data

Apr. 30, 2020 (CN) .......................... 202010366850.9

(51) Int. Cl.
| | |
|---|---|
| G06F 15/16 | (2006.01) |
| G06F 9/54 | (2006.01) |
| H04L 29/06 | (2006.01) |
| G06F 9/50 | (2006.01) |
| H04L 9/40 | (2022.01) |
| H04L 67/289 | (2022.01) |

(52) U.S. Cl.
CPC ............ G06F 9/505 (2013.01); G06F 9/5033 (2013.01); H04L 63/101 (2013.01); H04L 63/102 (2013.01); H04L 67/289 (2013.01)

(58) Field of Classification Search
CPC ..... G06F 9/505; G06F 9/5033; H04L 63/101; H04L 63/102; H04L 67/289

USPC .......................................................... 709/226
See application file for complete search history.

(56) References Cited

U.S. PATENT DOCUMENTS

| | | | | |
|---|---|---|---|---|
| 10,037,358 | B2* | 7/2018 | Faitelson | G06F 16/93 |
| 10,466,868 | B2* | 11/2019 | Boucher | G06F 3/0486 |
| 10,489,685 | B1* | 11/2019 | Rubin | G06V 30/2253 |
| 2006/0016871 | A1* | 1/2006 | Bonalle | G06Q 20/40145 |
| | | | | 235/382 |
| 2006/0016872 | A1* | 1/2006 | Bonalle | G06Q 20/341 |
| | | | | 235/382 |
| 2007/0116013 | A1* | 5/2007 | Brown | H04L 67/22 |
| | | | | 370/395.53 |
| 2009/0076966 | A1* | 3/2009 | Bishop | G06Q 20/363 |
| | | | | 705/67 |
| 2014/0075004 | A1* | 3/2014 | Van Dusen | G06Q 30/0201 |
| | | | | 709/223 |

(Continued)

FOREIGN PATENT DOCUMENTS

| | | | | |
|---|---|---|---|---|
| EP | | 3926429 A1 * | 12/2021 | |
| WO | WO-2020157449 A1 * | | 8/2020 | H04L 41/08 |
| WO | WO-2020166329 A1 * | | 8/2020 | |

*Primary Examiner* — Hamza N Algibhah
(74) *Attorney, Agent, or Firm* — ScienBiziP, P.C.

(57) ABSTRACT

An edge computing access method, enables an edge computing node device to receive data sent by a terminal device and carry out a security check on the data, determine whether the terminal device has been registered for access, register the terminal device when the terminal device has not been registered, and allow access to data after determining that the terminal device is registered to obtain access, structuring the accessed data to obtain structured data, render the structured data to obtain classified data, and calculate the classified data to obtain calculation result.

14 Claims, 4 Drawing Sheets

(56) References Cited

U.S. PATENT DOCUMENTS

| | | | |
|---|---|---|---|
| 2017/0235848 A1* | 8/2017 | Van Dusen | G06N 20/00 |
| | | | 705/12 |
| 2018/0113571 A1* | 4/2018 | Bastide | G06V 10/22 |
| 2018/0373762 A1* | 12/2018 | Faitelson | G06F 16/2457 |
| 2020/0007505 A1* | 1/2020 | Guo | H04L 63/0263 |
| 2020/0126650 A1* | 4/2020 | Loscutoff | G16H 10/60 |
| 2020/0177671 A1* | 6/2020 | Tofighbakhsh | H04L 67/1002 |
| 2020/0293558 A1* | 9/2020 | Hirao | G05B 19/4183 |
| 2022/0092404 A1* | 3/2022 | O'Connor | G06N 3/0454 |

* cited by examiner

EDGE COMPUTING ACCESS METHOD AND AN EDGE COMPUTING NODE DEVICE

CROSS-REFERENCE TO RELATED APPLICATIONS

This application claims priority to Chinese Patent Application No. 202010366850.9 filed on Apr. 30, 2020, the contents of which are incorporated by reference herein.

FIELD

The subject matter herein generally relates to communications, especially to an edge computing access method and an edge computing node device.

BACKGROUND

Edge computing reduces the pressure of the cloud platform, avoids data congestion, reduces latency and resolves massive amounts of information relevant to access which would otherwise need to be done by the cloud platform. Access process for existing edge computing resources is complex and there is no unified data access process, which makes the edge computing data access process power-hungry and wasteful of broadband resources.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
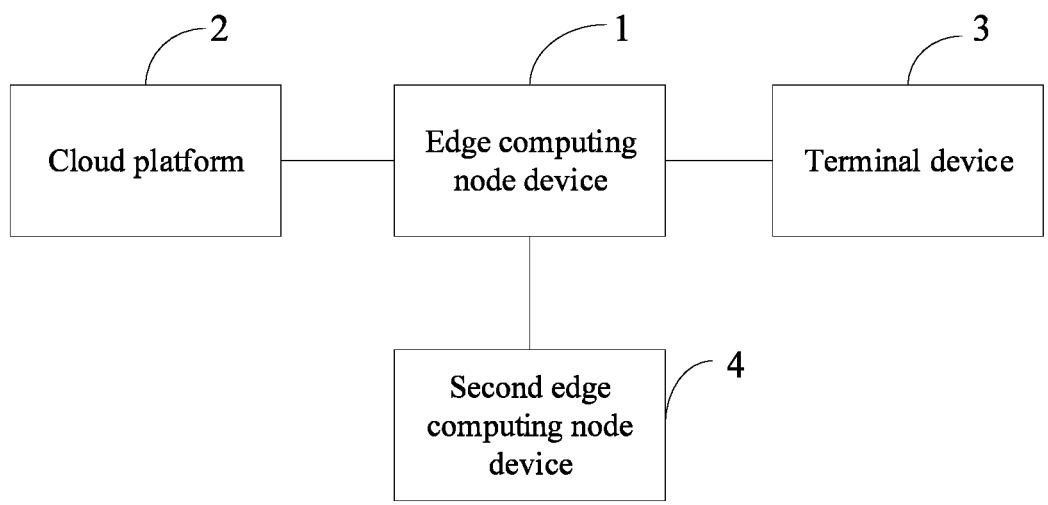
FIG. 1 is a block diagram of an embodiment of a running environment of an edge computing node device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a running environment of an edge computing node device 1. The edge computing node device 1 communicates with a cloud platform 2, a terminal device 3, and a second edge computing node device 4. The edge computing node device 1 receives data sent by the cloud platform 2, by the terminal device 3, or by the second edge computing node device 4. In one embodiment, the cloud platform 2 is a cloud platform server. The terminal device 3 includes at least one sensor, a data collector, and a controller. In another embodiment, the cloud platform 2 can be an edge computing device, for example, the cloud platform 2 can be another edge computing node device or an edge cloud. In one embodiment, the edge computing node device 1 is a logical abstraction of the basic ability of an edge gateway, an edge controller, and edge server, and has functions of real-time data analysis, local data storage, and real-time network connection. In one embodiment, the second edge computing node device 4 has a same structure as the edge computing node device 1.

Figure 2:
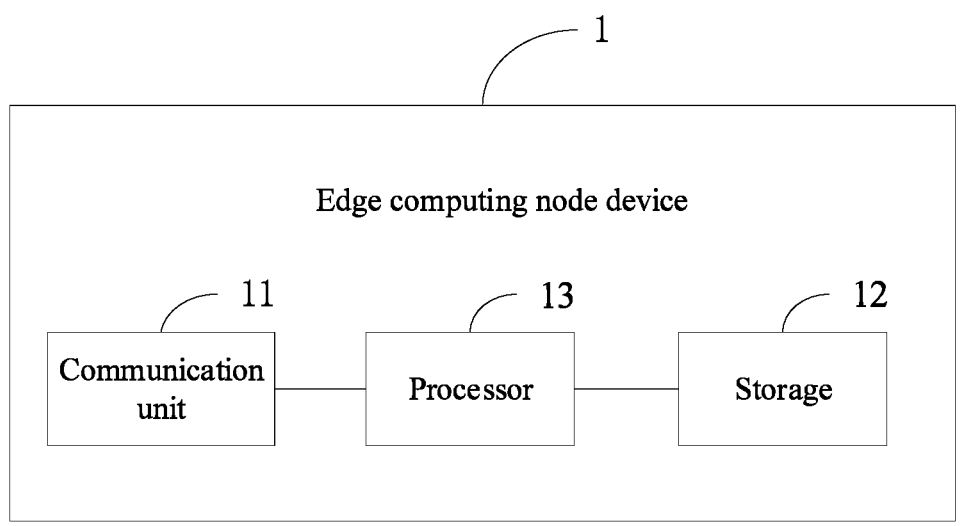
FIG. 2 is a block diagram of an embodiment of the edge computing node device of FIG. 1.

FIG. 2 illustrates the edge computing node device 1. The edge computing node device 1 includes a communication unit 11, a storage 12, a processor 13. In one embodiment, the processor 13 connects to the communication unit 11 and the storage 12. In one embodiment, the edge computing node device 1 communicates with the cloud platform 2 and the terminal device 3 by the communication unit 11. In one embodiment, the communication unit 11 is a wireless communication module, for example, the communication unit 11 can be a 4G communication module, a 5G communication module, a WI-FI communication module, a LORA communication module or an NBIOT communication module. In another embodiment, the communication unit 11 can be a wired communication module, for example, the communication unit 11 can be a PROFIBUS, a MODBUS, a CAN-BUS, an ETHERCAT bus, a fiber optic, or an ETHERNET.

The storage 12 stores data or soft code of the edge computing node device 1. In one embodiment, the storage 12 can include various types of non-transitory computer-readable storage mediums. For example, the storage 12 can be an internal storage system of the edge computing node device 1, such as a flash memory, a random access memory (RAM) for the temporary storage of information, and/or a read-only memory (ROM) for permanent storage of information. In another embodiment, the storage 12 can also be an external storage system of the edge computing node device 1, such as a hard disk, a storage card, or a data storage medium. In one embodiment, the processor 13 can be a central processing unit, a common processor, a digital signal processor, a dedicated integrated circuit, a ready-made programmable gate array or another programmable logic device, a discrete door or transistor logic device, discrete hardware component, or the like. In another embodiment, the processor 13 can be any conventional processor. The processor 13 can also be a control center of the edge computing node device 1, using various interfaces and lines to connect the various parts of the microprocessor 2.

Figure 3:
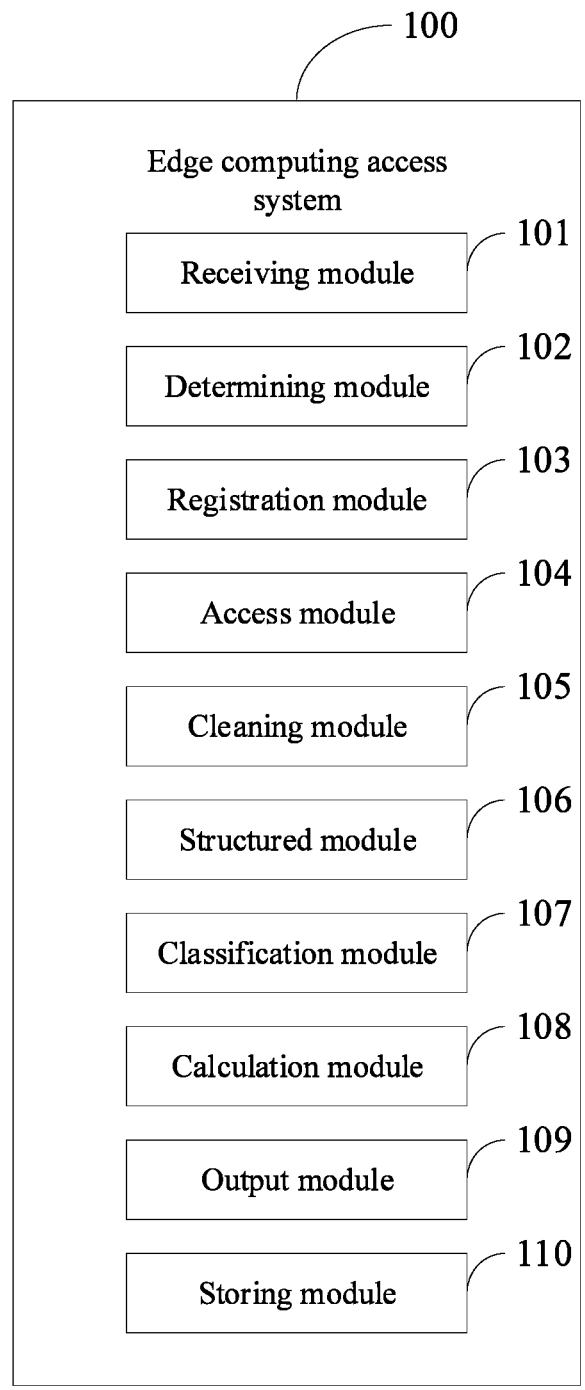
FIG. 3 is a block diagram of an edge computing access system.

FIG. 3 illustrates an edge computing access system 100. The edge computing access system 100 includes a receiving module 101, a determining module 102, a registration module 103, an access module 104, a cleaning module 105, a structured module 106, a classification module 107, a calculation module 108, an output module 109, and a storing module 110. The modules 101-110 of the edge computing access system 100 can be collections of software instructions. In the present embodiment, the receiving module 101, the determining module 102, the registration module 103, the access module 104, the cleaning module 105, the structured module 106, the classification module 107, the calculation module 108, the output module 109 and the storing module 110 are stored in the storage 12 of the edge computing node device 1 and executed by the processor 13 of the edge computing node device 1. In another embodiment, the receiving module 101, the determining module 102, the registration module 103, the access module 104, the cleaning module 105, the structured module 106, the classification module 107, the calculation module 108, the output module 109, and the storing module 110 are program segments or code in the processor 13 of the edge computing node device 1.

The receiving module 101 receives data sent by the terminal device 3 and carries out a security check on the data.

In one embodiment, the receiving module 101 receives the data by the communication unit 11. The receiving module 101 selects a checking mode from three checking modes, which comprises a virus scanning mode, a whitelist scanning mode and security authentication mode, and checks the data according to the selected checking mode, records abnormal data of which a security check result is abnormal, distinguishes and reports the abnormal data. In one embodiment, when checking the data according to the virus scanning mode, the receiving module 101 compares the data with virus files in a virus database and acquires the security check result of the data and determines that the data is abnormal when the security check result of the data is that the data is consistent with the virus files in the virus database, otherwise determining that the data is normal. In one embodiment, when checking the data according to the whitelist scanning mode, the receiving module 101 compares the data with lists in a whitelist database and acquires the security check result of the data, determining that the data is abnormal when the security check result of the data is that the data is consistent with the lists in the whitelist database, otherwise determining that the data is normal. In one embodiment, when checking the data according to the checking mode of security authentication, the receiving module 101 determines that the data is abnormal when the data does not pass security authentication, otherwise determining that the data is normal.

The determining module 102 determines whether the terminal device 3 has been registered by the edge computing node device 1.

The registration module 103 registers the terminal device 3 when determining that the terminal device 3 has not been registered.

In one embodiment, the registration module 103 records an identification number of the terminal device 3, marks the data as continuous data when the data is continuous or marks the data as non-continuous data when the data is not continuous, records a calculation algorithm or a calculation model of the data, records a time of processing when the data is processed according to the calculation algorithm of the data or the calculation model of the data, and sets output interface of the data's calculation result.

The access module 104 accesses the data after determining that the terminal device 3 is registered to obtain access data.

In one embodiment, the access module 104 further stores the access data. In one embodiment, the access module 104 stores the access data in a preset storage location of the storage 12.

The cleaning module 105 cleans the access data to obtain clean data.

In one embodiment, as the data sent by the terminal device 3 may have incomplete data, duplicate data, default data, redundant data, or another defect, an analysis based on the data produces incorrect results. Therefore, cleaning the data sent by the terminal device 3 is necessary.

In one embodiment, the cleaning module 105 removes redundant data, fragmented data, and noise from the access data according to a preset cleaning rule algorithm. In one embodiment, the preset cleaning rule algorithm can be the removal of missing values method, a mean filling method, or a hot card filling method. In one embodiment, the removal of missing values method is to directly drop samples with missing values from the access data. The mean filling method is to divide the access data into groups according to a property correlation coefficient of the missing value in the access data, calculate a mean value of each group, and insert the mean as the missing value. The hot card filling method is to find an object in a database that has a value similar to the missing value and then infill the value of such an object into the missing value.

The structured module 106 structures the access data or the clean data to obtain structured data.

In one embodiment, the access data or the clean data includes numerical data and control data. The numerical data is a specific value. For example, the numerical data can be a temperature value collected from a temperature sensor or a humidity value collected from a humidity sensor. In one embodiment, the control data is a command issued to a platform, to a sensor, or to an industrial apparatus. In one embodiment, when the access data or the clean data is the numerical data, the structured module 106 structures same to obtain the structured data by adding a data ID, data species, a custom enumeration type, a data name, a data description, a data group ID, a data type, a measurement unit of the access data or the clean data, a byte length of the access data or the clean data, an upper limit value of the access data or the clean data, a center value of the access data or the clean data, a missing identity of the access data or the clean data, a default access property of the access data or the clean data, data generation time, and a customized data property. In one embodiment, in the default access property of the access data or the clean data, R indicates read-only, W indicates write-only, RW indicates read & write.

In one embodiment, when the access data or the clean data is the control data, the structured module 106 structures same to obtain the structured data by adding a data ID, a data species, a custom enumeration type, a control command name, a control command function description, a control command, a target device ID, a command interface, and a number of command parameters. The command parameters can be a command parameter 1, a command parameter 2, or a command parameter n, where n is a positive integer that is more than one.

In one embodiment, the structured module 106 structures the numerical data or the control data to obtain the structured data by adding a device ID, a device type, a device name, a device function, and other properties.

The classification module 107 classifies the structured data to obtain classification data.

In one embodiment, the classification module 107 classifies the structured data according to the data ID of the structured data to obtain the classification data corresponding to different data IDs. In another embodiment, the classification module 107 classifies the structured data according to the device ID of the structured data to obtain the classification data corresponding to different device IDs.

The calculation module 108 calculates the classification data to obtain calculation result.

In one embodiment, the calculation module 108 calculates the classification data according to the recorded calculation method and the calculation model to obtain the calculation result.

The output module 109 outputs the calculation results to the cloud platform 2 or the terminal device 3. In one embodiment, the output module 109 outputs the calculation results to the cloud platform 2 or the terminal device 3 by the communication unit 11.

The storing module 110 stores the access data, the clean data, the structured data, the classification data, and the calculation result according to a preset rule. In detail, the storing module 110 sets a data storage path, a data storage cycle and data storage start time, and stores the access data, the clean data, the structured data, the classification data, and the calculation result according to the data storage path, the data storage cycle and the data storage start time respectively. In one embodiment, the data storage path can be set in a local database of the edge computing node device 1, the cloud platform 2, the terminal device 3, or the second edge computing node device 4.

Figure 4:
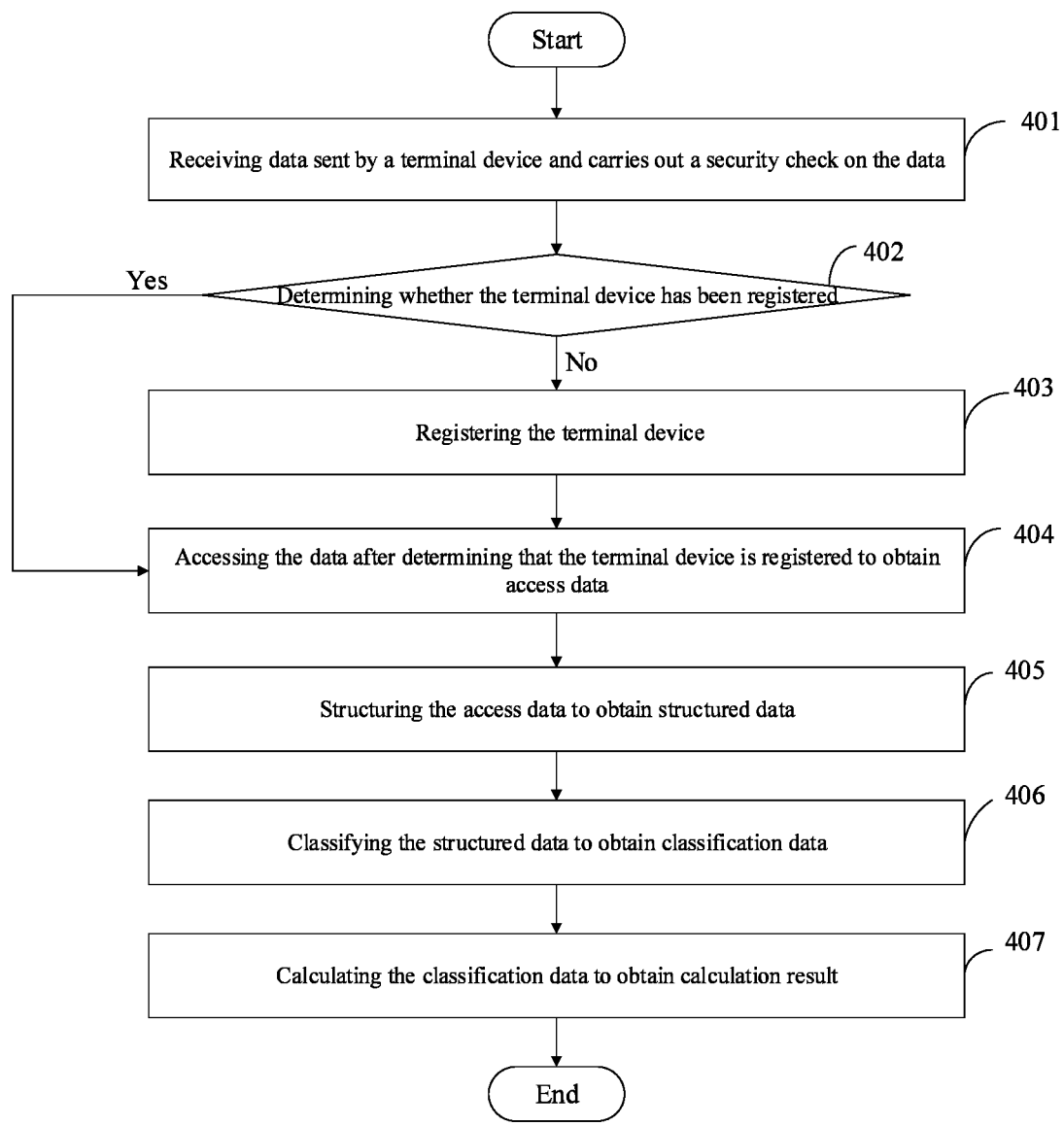
FIG. 4 is a flowchart of an embodiment of an edge computing access method.

FIG. 4 illustrates a flowchart of an embodiment of an edge computing access method. The edge computing access method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, an edge computing node device receives data sent by a terminal device and carries out a security check on the data.

In one embodiment, the edge computing node device receives the data by a communication unit. The edge computing node device selects a checking mode from three checking modes, which comprises a virus scanning, a whitelist scanning mode and a security authentication mode, and checks the data according to the selected checking mode, records abnormal data of which a security check result is abnormal, distinguishes and reports the abnormal data. In one embodiment, when checking the data according to the virus scanning mode, the edge computing node device compares the data with virus files in a virus database and acquires the security check result of the data, and determines that the data is abnormal when the security check result of the data is that the data is consistent with the virus files in the virus database, otherwise determining that the data is normal. In one embodiment, when checking the data according to the checking mode of whitelist scanning, the edge computing node device compares the data with lists in a whitelist database and acquires the security check result of the data, determining that the data is abnormal when the security check result of the data is that the data is consistent with the lists in the whitelist database, otherwise determining that the data is normal. In one embodiment, when checking the data according to the security authentication mode, the edge computing node device determines that the data is abnormal when the data does not pass security authentication, otherwise determining that the data is normal.

At block 402, the edge computing node device determines whether the terminal device has been registered.

At block 403, the edge computing node device registers the terminal device 3 when determining that the terminal device 3 has not been registered.

In one embodiment, the edge computing node device records an identification number of the terminal device, marks the data as continuous data when the data is continuous or marks the data as non-continuous data when the data is not continuous, records the calculation algorithm of the data or a calculation model of the data, records a time of processing when the data is processed according to the data's calculation algorithm or calculation model and sets output interfaces of the data's calculation result.

At block 404, the edge computing node device accesses the data after determining that the terminal device is registered to obtain access data.

In one embodiment, the edge computing node device stores the access data. In one embodiment, the edge computing node device stores the access data in a preset storage location of the edge computing node device.

In one embodiment, the method further includes: the edge computing node device cleans the access data to obtain clean data. In one embodiment, the edge computing node device removes redundant data, fragmented data, and noise from the access data according to a preset cleaning rule algorithm. In one embodiment, the preset cleaning rule algorithm can be the removal of missing values method, a mean filling method, or a hot card filling method. In one embodiment, the removal of missing values method is to directly drop samples with missing values from the access data. The mean filling method is to divide the access data into groups according to a property correlation coefficient of the missing value, calculate a mean value of each group, and insert the mean as the missing value. The hot card filling method is to find an object in a database that has a value similar to the missing value and then infill the value of such an object into the missing value.

At block 405, the edge computing node device structures the access data to obtain structured data.

In one embodiment, the access data or the clean data includes numerical data and control data. The numerical data is a specific value. For example, the numerical data can be a temperature value collected from a temperature sensor or a humidity value collected from a humidity sensor. In one embodiment, the control data is a command issued to a platform, to a sensor, or to an industrial apparatus. In one embodiment, when the access data or the clean data is the numerical data, the edge computing node device structures same to obtain the structured data by adding a data ID, data species, a custom enumeration type, a data name, a data description, a data group ID, a data type, a measurement unit, a byte length, an upper limit value, a center value, a missing identity, a default access property, data generation time, and a customized data property. In one embodiment, in the default access property of the access data or the clean data, R indicates read-only, W indicates write-only, and RW indicates read & write.

In one embodiment, when the access data or the clean data is the control data, the edge computing node device structures same to obtain the structured data by adding a data ID, a data species, a custom enumeration type, a control command name, a control command function description, a control command, a target device ID, a command interface, and a number of command parameters. The command parameters can be a command parameter 1, a command parameter 2, or a command parameter n, where n is a positive integer that is more than one.

In one embodiment, the edge computing node device structures the numerical data or the control data to obtain the structured data by adding a device ID, a device type, a device name, a device function, and other properties.

At block 406, the edge computing node device classifies the structured data to obtain classification data.

In one embodiment, the edge computing node device classifies the structured data according to the data ID of the structured data to obtain the classification data corresponding to different data IDs. In another embodiment, the edge computing node device classifies the structured data according to the device ID of the structured data to obtain the classification data corresponding to different device IDs.

At block 407, the edge computing node device calculates the classification data to obtain calculation result.

In one embodiment, the edge computing node device calculates the classification data according to the recorded calculation method and the calculation model to obtain the calculation result.

In one embodiment, the method further includes: the edge computing node device outputs the calculation results to the cloud platform or the terminal device by the output interfaces. In one embodiment, the edge computing node device outputs the calculation results to the cloud platform or the terminal device by the communication unit.

In one embodiment, the method further includes: the edge computing node device stores the access data, the clean data, the structured data, the classification data, and the calculation result according to a preset rule. In detail, the edge computing node device sets a data storage path, a data storage cycle, and data storage start time, and stores the access data, the clean data, the structured data, the classification data, and the calculation result according to the data storage path, the data storage cycle and the data storage start time respectively. In one embodiment, the data storage path can be set in a local database of the edge computing node device 1, the cloud platform 2, the terminal device 3, or the second edge computing node device 4.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An edge computing node device, comprising:
   a processor;
   a non-transitory storage medium coupled to the processor and configured to store a plurality of instructions, which causes the processor to:
   receive data sent by a terminal device and carry out a security check on the data;
   determine whether the terminal device has been registered;
   register the terminal device when the terminal device has not been registered;
   access the data after determining that the terminal device has been registered to obtain access data;
   clean the access data to obtain clean data;
   structure the access data or the clean data to obtain structured data by adding a data ID, data species, a custom enumeration type, a data name, a data description, a data group ID, a data type, a byte length of the access data or the clean data, an upper limit value of the access data or the clean data, a center value of the access data or the clean data, data generation time, and a customized data property;
   classify the structured data to obtain classification data; and
   calculate the classification data to obtain calculation result.

2. The edge computing node device according to claim 1, wherein the plurality of instructions is further configured to cause the processor to:
   select a checking mode from three checking modes, which comprises a virus scanning mode, a whitelist scanning mode and a security authentication mode, and
   check the data according to the selected checking mode, record abnormal data of which a security check result is abnormal, distinguish and report the abnormal data.

3. The edge computing node device according to claim 1, wherein the plurality of instructions is further configured to cause the processor to:
   record an identification number of the terminal device;
   mark the data as continuous data when the data is continuous, or mark the data as non-continuous data when the data is not continuous;
   record a calculation algorithm or a calculation model of the data;
   record a time of processing when the data is processed according to the calculation algorithm or the calculation model of the data; and
   set output interfaces of data's calculation result.

4. The edge computing node device according to claim 1, wherein the plurality of instructions is further configured to cause the processor to:
   structure the access data or the clean data to obtain the structured data by adding a data ID, a data species, a control command name, a control command function description, a control command, and a number of command parameters.

5. The edge computing node device according to claim 1, wherein the plurality of instructions is further configured to cause the processor to:
   set a data storage path, a data storage cycle and data storage start time, and store the access data, the clean data, the structured data, the classification data, and the calculation result according to the data storage path, the data storage cycle and the data storage start time.

6. An edge computing access method comprising:
receiving data sent by a terminal device and carry out a security check on the data;
determining whether the terminal device has been registered;
registering the terminal device when the terminal device has not been registered;
accessing the data after determining that the terminal device is registered to obtain access data;
cleaning the access data to obtain clean data;
structuring the access data or the clean data to obtain structured data by adding a data ID, data species, a custom enumeration type, a data name, a data description, a data group ID, a data type, a byte length of the access data or the clean data, an upper limit value of the access data or the clean data, a center value of the access data or the clean data, data generation time, and a customized data property;
classifying the structured data to obtain classification data; and
calculating the classification data to obtain calculation result.

7. The edge computing access method according to claim 6, further comprising:
selecting a checking mode from three checking modes, which comprises a virus scanning, a whitelist scanning and a security authentication, and checking the data according to the selected checking mode, recording abnormal data of which a security check result is abnormal, distinguishing and reporting the abnormal data.

8. The edge computing access method according to claim 6, further comprising:
recording an identification number of the terminal device;
marking the data as continuous data when the data is continuous or marking the data as non-continuous data when the data is not continuous;
recording a data's calculation algorithm or a calculation model of the data;
recording a time of processing when the data is processed according to the calculation algorithm or the calculation model of the data; and
setting output interfaces of data's calculation result.

9. The edge computing access method according to claim 6, further comprising:
structuring the access data or the clean data to obtain the structured data by adding a data ID, a data species, a control command name, a control command function description, a control command, and a number of command parameters.

10. The edge computing access method according to claim 6, further comprising:
setting a data storage path, a data storage cycle and data storage start time, and storing the access data, the clean data, the structured data, the classification data, and the calculation result according to the data storage path, the data storage cycle and the data storage start time.

11. A non-transitory storage medium having stored thereon instructions that, when executed by at least one processor of an edge computing node device, causes the least one processor to execute instructions of an edge computing access method, the edge computing access method comprising:
receiving data sent by a terminal device and carry out a security check on the data;
determining whether the terminal device has been registered;
registering the terminal device when the terminal device has not been registered;
accessing the data after determining that the terminal device is registered to obtain access data;
cleaning the access data to obtain clean data;
structuring the access data or the clean data to obtain structured data by adding a data ID, data species, a custom enumeration type, a data name, a data description, a data group ID, a data type, a byte length of the access data or the clean data, an upper limit value of the access data or the clean data, a center value of the access data or the clean data, data generation time, and a customized data property;
classifying the structured data to obtain classification data; and
calculating the classification data to obtain calculation result.

12. The non-transitory storage medium according to claim 11, wherein the edge computing access method further comprising:
selecting a checking mode from three checking modes, which comprises a virus scanning, a whitelist scanning and a security authentication, and checking the data according to the selected checking mode, recording abnormal data of which a security check result is abnormal, distinguishing and reporting the abnormal data.

13. The non-transitory storage medium according to claim 11, wherein the edge computing access method further comprising:
recording an identification number of the terminal device;
marking the data as continuous data when the data is continuous or marking the data as non-continuous data when the data is not continuous;
recording a calculation algorithm or calculation model of the data;
recording a time of processing when the data is processed according to the calculation algorithm or calculation model of the data; and
setting output interfaces of data's calculation result.

14. The non-transitory storage medium according to claim 11, wherein the edge computing access method further comprising:
setting a data storage path, a data storage cycle and data storage start time, and storing the access data, the clean data, the structured data, the classification data, and the calculation result according to the data storage path, the data storage cycle and the data storage start time.

* * * * *